(12) United States Patent
Seelig et al.

(10) Patent No.: US 7,579,715 B2
(45) Date of Patent: Aug. 25, 2009

(54) DEVICE AND METHOD FOR TRANSMITTING AND PROVIDING THE POWER OF CAPACITIVE ACTUATORS

(75) Inventors: Anton Seelig, Floersheim (DE); Dieter Reiners, Seeheim-Jugenheim (DE); Juergen Luther, Darmstadt (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 332 days.

(21) Appl. No.: 10/542,638

(22) PCT Filed: Dec. 13, 2003

(86) PCT No.: PCT/EP03/14214

§ 371 (c)(1),
(2), (4) Date: Jan. 13, 2006

(87) PCT Pub. No.: WO2004/066481

PCT Pub. Date: Aug. 5, 2004

(65) Prior Publication Data

US 2006/0267523 A1 Nov. 30, 2006

(30) Foreign Application Priority Data

Jan. 20, 2003 (DE) ................................ 103 01 978

(51) Int. Cl.
*H02J 3/00* (2006.01)
*H04B 3/00* (2006.01)
*B64C 27/00* (2006.01)

(52) U.S. Cl. ........................ 307/75; 307/89; 307/123; 244/7 A

(58) Field of Classification Search ................ 307/75, 307/89, 123; 244/7 A
See application file for complete search history.

(56) References Cited

U.S. PATENT DOCUMENTS

| | | | |
|---|---|---|---|
| 3,617,017 A | * | 11/1971 | Lafortune et al. ........ 244/17.11 |
| 4,953,068 A | | 8/1990 | Henze .......................... 363/17 |
| 5,709,291 A | | 1/1998 | Nishino et al. ................ 191/10 |
| 5,798,622 A | * | 8/1998 | Hirai et al. ..................... 318/16 |
| 6,005,304 A | * | 12/1999 | Seelig ......................... 307/104 |
| 6,032,546 A | * | 3/2000 | Stone ........................... 74/5.7 |
| 6,078,198 A | * | 6/2000 | Gerken et al. ................ 327/111 |

(Continued)

FOREIGN PATENT DOCUMENTS

| | | |
|---|---|---|
| DE | 199 27 087 | 12/2000 |
| DE | 199 27 190 | 12/2000 |
| JP | 07-046864 * | 2/1995 |
| JP | 07046864 A * | 2/1995 |
| WO | WO 00/48299 | 8/2000 |

OTHER PUBLICATIONS

International Search Report for PCT/EP2003/014214, dated Sep. 16, 2004, 5 pages.

*Primary Examiner*—Albert W Paladini
*Assistant Examiner*—Hal I Kaplan
(74) *Attorney, Agent, or Firm*—Darby & Darby

(57) ABSTRACT

A device for contactless electrical power transmission in a system including at least one stationary and one moving part, power being transmitted between the at least one stationary part and the at least one moving part includes an inductive transformer including a primary winding disposed on the stationary part and a secondary winding disposed on the moving part, the inductive transformer bridging an isolating point between the stationary part and the moving part. The device also includes a frequency generator having a series-resonant circuit capacitor connected to the primary winding and at least one actuator control element connected to the secondary winding and including a matrix arrangement of a plurality of switchable power semiconductors. At least portions of the inductive transformer, frequency generator and at least one actuator control element are disposed in an area of a rotor shaft and a rotor head of a rotary-wing aircraft.

9 Claims, 9 Drawing Sheets

U.S. PATENT DOCUMENTS

Figure 1:
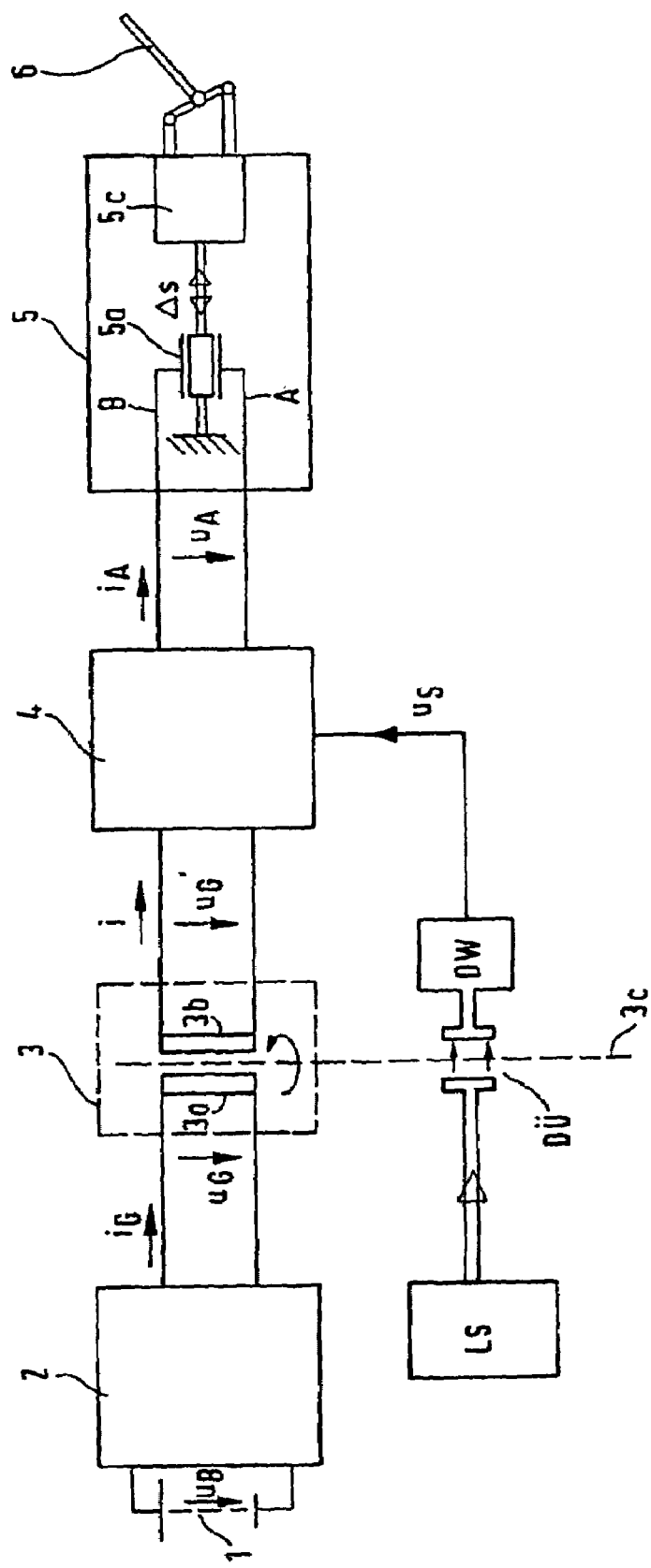

| | | | |
|---|---|---|---|
| 6,084,368 A * | 7/2000 | Doemens et al. | 318/493 |
| 6,181,235 B1 | 1/2001 | Smith | 340/310.01 |
| 6,227,204 B1 | 5/2001 | Baumann et al. | 128/899 |
| 6,231,013 B1 * | 5/2001 | Jaenker | 244/215 |
| 6,232,775 B1 * | 5/2001 | Naitoh et al. | 324/249 |
| 6,301,128 B1 | 10/2001 | Jang et al. | 363/17 |
| 6,462,432 B1 * | 10/2002 | Seelig et al. | 307/33 |
| 6,712,313 B2 * | 3/2004 | Zoppitelli et al. | 244/17.11 |
| 6,845,941 B2 * | 1/2005 | Pica | 244/10 |
| 6,934,167 B2 * | 8/2005 | Jang et al. | 363/21.02 |
| 7,198,223 B2 * | 4/2007 | Phelps et al. | 244/17.11 |
| 2002/0141867 A1 | 10/2002 | Preissler | 416/23 |

* cited by examiner

DEVICE AND METHOD FOR TRANSMITTING AND PROVIDING THE POWER OF CAPACITIVE ACTUATORS

The invention relates to a device for contactless electrical power transmission and/or to a control device in a system consisting of at least one stationary and one moving part, between which power is to be transmitted, having at least one means in the moving part that is to be controlled and supplied with power, whereby a series-resonant circuit capacitor of a frequency generator is connected to a primary winding of an inductive transformer that bridges an isolating point between the stationary part and the moving part.

BACKGROUND

In such systems, as the need arises, electrical power and control signals have to be transmitted from the stationary part of the system to the moving part of the system because the moving part has at least one element, for example, a control element, that has to be supplied with power during operation and that has to be controlled on the basis of the function. Alternatively, systems should also be taken into consideration in which control elements such as, for instance, capacitive actuators, have to be actuated over a certain distance.

The literature (see, for example, A. Esser, "A New Approach to Synchronize a Bidirectional DC to DC Converter for Contactless Power Supplies", ETEP Vol. 3, No. 2, March/April 1993) discloses a method and an arrangement that allow bidirectional transmission of electrical power via articulated-arm robot joints at any desired wide angle of rotation without the need for an electrically conductive connection that runs over the rotary joint. For this purpose, an inverter forms a higher-frequency alternating voltage from direct voltage on the input side of the joint and said alternating voltage is then transmitted by means of an inductive transformer from a primary winding of the transformer on the one side of an isolating point, that is to say, an air gap, to a secondary winding that lies on the other side of the isolating point, where it is converted once again into a direct voltage. The direct-voltage-to-alternating voltage converters and alternating-voltage-to-direct-voltage converters employed in this process are configured as inverters, so that they can be operated bidirectionally and consequently the power flow is reversible. A capacitor that was charged downstream from the isolating point on the secondary side can be discharged by transmitting the power back to the primary side via the isolating point.

Control elements are also fundamentally known. One example of this is the piezo element that is employed as a capacitive actuator in automobiles, aircraft or other technical devices where components have to be moved at a high frequency and medium actuating force. This can be done by installing control members individually or in the form of groups of several control members. Regarding the latter, German patent application DE 199 27 087 A1 describes a method and a device for charging and discharging several piezo electric elements. By means of appropriately actuated charging and discharging switches, groups comprising one or more piezo electric elements can be charged or discharged independently of each other. During the power exchange between the capacitor on the secondary side—which, as a buffer capacitor, has a larger capacitance than the piezo elements, whereby both capacitors are generally charged at different voltages—the rise of the charging and discharging current is limited by a winding and its magnitude is set by periodic switching, also referred to as cycling. This cycling is done by switching high-frequency semiconductor switches on and off, whereby the charging and discharging current stored in a winding 2 generates a high switching loss in the semiconductors during the switching. Another drawback of this method and arrangement is the double wall and the storage of power in the moving system. The alternating voltage or the alternating current inductively transmitted via the isolating point, i.e., the air gap, is rectified in the moving system and the power is stored in a buffer capacitor, usually configured as an electrolyte capacitor, that is even considerably larger than the capacitor of the piezo element. Then one or more piezo elements are charged with current cycled from the buffer capacitor at a high frequency. In contrast, it is desirable to have a method that supplies the power transmitted at a higher-frequency voltage or higher-frequency current to the piezo electric elements via the isolating point without any intermediate storage.

However, nowhere does this publication indicate how the piezo electric elements are to be actuated, particularly when the latter are arranged on the moving part of a system consisting of a stationary part and a moving part. Furthermore, in the case of special moving systems that are exposed to vibrations and/or high speeds, the problem arises that certain electric components are no longer suited for these operating conditions. Assuming, for instance, that the device is deployed in the area of the rotor shaft and the rotor head of a helicopter, then the high mechanical load makes it fundamentally impossible to use electrolyte capacitors. Particularly in applications involving rough ambient conditions such as high and low temperatures as well as large centrifugal acceleration forces on the moving system, for example, on the rotor head of a helicopter, operations using electrolyte capacitors are only possible at considerable risk.

World patent WO-A-0048299 describes a device for converting higher voltages of the type employed, for example, in trains or streetcars, into low direct voltages or alternating voltages, as is necessary for the operation of lighting systems or air-conditioning units. For this purpose, a transformer is employed that galvanically separates the primary and the secondary circuits from each other in a known manner. However, no provisions are made for transmitting power and control signals from a static part to a rotating part of a system or else for operating an actuator control element on the rotating part of the system by means of the transmitted signals.

U.S. Pat. No. 5,709,291 discloses a device with which power is transmitted contactless to a moving device, for instance, from a work station to the next moving pallet. For this purpose, a bar-type transformer is employed that allows linear movements of the moving device. The voltage that is transmitted by this transformer to the moving device is at first rectified and then used to charge a battery that is carried on the moving. device. The battery is used to supply a motor that is carried on the moving device. Influencing the motor controls by utilizing the transformer is not described here. Moreover, this system is not suitable for use in the area of the rotor shaft and the rotor head of a helicopter since the use of batteries in the area of the rotor head is not possible due to weight and space considerations. Requirements calling for a wide useful temperature range and for resistance to high centrifugal acceleration forces cannot be met when batteries are used.

SUMMARY OF THE INVENTION

The present invention is based on an objective of providing a method and a device for the power supply and control of capacitive actuators which, on the one hand, allow the actuation of the actuators over a certain distance and which, on the other hand, allow the transmission of the power of the actuators arranged on the moving part of the system to the moving part separated by an isolating point, said method and device supplying power to the actuators arranged on the moving part as a function of the desired force effects or the intended movements, without the need for any intermediate storage of the power in an electrolyte capacitor on the moving part system.

Within the scope of the invention, additional embodiment possibilities exist for the method and for the device for carrying out the method, and these will be described below.

With the method according to the invention, a frequency generator 2 generates a higher-frequency alternating current $i_G$ having an amplitude that is independent of the phase angle and of the amplitude of a reverse voltage $u_G$ and said higher-frequency alternating current $i_G$ is then transmitted to a moving part system by means of an inductive transformer 3. The higher-frequency alternating current i coming from the secondary winding of the transformer—separated into positive and negative half-waves or segments of these half-waves—is impressed into the actuator by means of an electronic control element 4 in such a direction that a length change Δs of the actuator occurs in a desired direction in each half-wave.

Here, the range of the operating frequency of the frequency generator 2 lies between approximately 25 kHZ and several MHz. Preference is given to the range around 100 KHz. When the operating frequency is selected, the output to be controlled as well as the spatial distance to be bridged from the frequency generator to the actuators have to be taken into account. It fundamentally applies that the useful frequency drops as the output and/or the distance increase.

The method for providing electrical power for at least one capacitive actuator that is arranged on the moving part is characterized in that the frequency generator 2 in the stationary part generates a higher-frequency alternating current $i_G$ from the direct voltage 1, said higher-frequency alternating current $i_G$ having an amplitude that is independent of the phase angle and of the amplitude of the reverse voltage $u_G$, and in that the alternating current $i_G$ is transmitted to the primary winding 3a of the inductive transformer that bridges the isolating point, whereby the higher-frequency alternating current i coming from the secondary winding 3b in the moving part system—separated into positive and negative half-waves or segments of these half-waves—is always impressed into the actuator by means of an electronic control element 4 in such a direction that a length change Δs of the actuator occurs in the desired direction in each half-wave.

The method for providing the power of capacitive actuators is also characterized in that the higher-frequency alternating current i—separated into positive and negative half-waves or segments of these half-waves—is always impressed into the actuator by means of an electronic control element 4 as a function of the difference $u_S$-$u_A$ between the setpoint $u_S$ of the actuator voltage and the actual actuator voltage $u_A$, in the direction at which the magnitude of the voltage difference $u_S$-$u_A$ decreases.

Moreover, the method for providing the power of capacitive actuators is also characterized in that the higher-frequency alternating current i—separated into positive and negative half-waves or segments of these half-waves—is always impressed into the actuator by means of an electronic control element 4 as a function of the difference between a setpoint of the actuator length and the actual value of the actuator length, in the direction at which the magnitude of the difference between the setpoint of the actuator length and the actual value of the actuator length decreases.

Furthermore, the method for providing the power of capacitive actuators is also characterized in that the setpoint $u_S$ of the actuator voltage is formed on the basis of the deviation between a setpoint of the actuator length and the actual value of the actuator length.

The method for providing the power of capacitive actuators is likewise characterized in that the actual value of the actuator length is ascertained by detecting a path or an angle at the mechanical transmission 5c of the actuator.

The method for providing the power of capacitive actuators is characterized by the following process steps: the separate impressing of the half-waves having different polarity or of the corresponding half-wave segments of the higher-frequency alternating current i occurs within each half-wave in three consecutive phases of the operating states "inverter operation", "no-load operation" and "rectifier operation", whereby the transition between the phases of the operating states is made by switching off a semiconductor switch and whereby the duration or the magnitude of the angular ranges of the individual phases determines the direction and the value of the mean charge and power transport.

Finally, the method for providing the power of capacitive actuators is characterized in that the duration or the magnitude of the angular ranges of the phases of the operating states is adjusted with respect to the conductive areas of the switch pairs in the initial position S10, S30 or S20, S40 by shifting the conductive areas of a switch pair S1, S3 or S2, S4 connected in series, and in that the conductive area signals of the initial position S10, S30 or S20, S40 of the switch pairs S1, S3 or S2, S4 connected in series have a constant phase angle within a switching grid SR that is synchronized to the impressed higher-frequency current i.

The arrangement for carrying out the method encompasses the features that it comprises a frequency generator 2 consisting of an inverter with interruptible semiconductor switches T1-T4 and a downstream series-resonant circuit $L_G$, $C_G$ whose resonance frequency $f_G$ matches the inverter frequency $f_W$, and it comprises an actuator control element 4 containing at least one circuit 4a, 4b, 4c with interruptible power semiconductors in a matrix arrangement, said actuator control element 4 impressing the current $i_G$, i that was tapped at the series-resonant circuit capacitor $C_G$ of the frequency generator 2—separated into positive and negative half-waves or segments of these half-waves—into the actuator 5, 5a in such a direction that the charge and the power stored in the actuator increase or decrease in each half-wave of the current as a function of the desired length change (Δs) of the actuator.

The arrangement for carrying out the method is characterized by the features that it comprises a frequency generator 2 consisting of an inverter with interruptible semiconductor switches T1-T4 and a downstream series-resonant circuit $L_G$, $C_G$ whose resonance frequency $f_G$ matches the inverter frequency $f_W$, and it comprises an actuator control element 4 containing at least one circuit 4a, 4b, 4c with interruptible power semiconductors in a matrix arrangement, said actuator control element 4 impressing the current $i_G$, i that was tapped at the series-resonant circuit capacitor $C_G$ of the frequency generator 2—separated into positive and negative half-waves or segments of these half-waves—into the actuator 5, 5a in such a direction that the charge and the power stored in the actuator increase or decrease in each half-wave of the current as a function of the desired length change (Δs) of the actuator.

The arrangement for carrying out the method is characterized by the features that the series-resonant circuit capacitor $C_G$ of the frequency generator 2 is connected to the primary winding 3a of an inductive transformer 3 that bridges an isolating point 3c, and that the secondary winding 3b of the transformer located on the moving part is connected to the circuits 4a, 4b, 4c with interruptible power semiconductors in a matrix arrangement of the actuator control element 4.

The arrangement for carrying out the method is also characterized in that the actuator control element 4 comprises regulating means $4_R$ and controlling means $4_{ST}$ for impressing positive and negative half-waves or half-wave segments of the higher-frequency alternating current i into the actuator 5, 5a, in that the regulating means $4_R$ causes the controlling means $4_{ST}$ to form different-sized half-wave segments of the current i through a signal $\phi$ as a function of the magnitude of the difference $u_S$-$u'_A$ between the setpoint us and the actual value $u'_A$ of the actuator voltage, and in that the regulating means $4_R$ causes the controlling means $4_{ST}$ to control the power semiconductors S1, S3, S2, S4 through the signal G/W as a function of the polarity sign of the difference $u_S$-$u'_A$ between the setpoint $u_S$ and the actual value $u'_A$ of the actuator voltage, in such a way that, when the polarity sign of the difference $u_S$-$u'_A$ is negative, a successive charge or power is withdrawn from the actuator 5, 5a from one half-wave to the next and, when the polarity sign of the difference $u_S$-$u'_A$ is positive, a successive charge or power is supplied to the actuator 5, 5a from one half-wave to the next.

The arrangement for carrying out the method is characterized by the features that the control element 4 comprises regulating means $4_R$ and controlling means $4_{ST}$ for impressing positive and negative half-waves or half-wave segments of the higher-frequency alternating current i into the actuator 5, 5a, that the actuator 5, 5a has means to detect the actual value of the actuator length, that, through a signal $\phi$, the regulating means $4_R$ causes the controlling means $4_{ST}$ to form different-sized half-wave segments of the current i as a function of the magnitude of the difference between the setpoint and the actual value of the actuator length, and that, via the signal G/W, the regulating means $4_R$ causes the controlling means $4_{ST}$ to control the power semiconductors S1, S3, S2, S4 as a function of the polarity sign of the difference between the setpoint and the actual value of the actuator length in such a way that, when the polarity sign of the difference is negative, a successive charge or power is withdrawn from the actuator 5, 5a from one half-wave to the next and, when the polarity sign of the difference is positive, a successive charge or power is supplied to the actuator 5, 5a from one half-wave to the next.

The arrangement for carrying out the method is characterized in that the actuator 5, 5a has means to detect the actual value of the actuator length and in that the actuator control element 4 has means to form a setpoint $u_S$ of the actuator voltage on the basis of the deviation between a setpoint of the actuator length and the actual value of the actuator length.

The arrangement for carrying out the method is characterized in that the actuator 5 has means to detect and convert a path or an angle of the mechanical transmission 5c into the actual value of the actuator length.

The arrangement for carrying out the method is also characterized in that signals SR of a switching grid that is synchronized to the alternating current i are supplied to the controlling means $4_{ST}$ for impressing half-waves or half-wave segments of the alternating current i into the actuator, in that the controlling means $4_{ST}$ encompasses logic means which, on the basis of signals SR of the switching grid, form conductive area signals S10, S30 and S20, S40 of the initial position of the semiconductor switch pairs S1, S3 and S2, S4 connected in series, in that the controlling means $4_{ST}$ comprises means for the leading shift of the conductive areas of the switch pair S2, S4 with respect to the initial position S20, S40 during the rectifier operation and it also comprises means for the trailing shift of the conductive areas of the switch pair S1, S3 with respect to the initial position S10, S30 during the inverter operation, and in that a signal G/W is supplied to the controlling means $4_{ST}$ by the regulating means $4_R$ in order to set the direction of the shift and a signal $\phi$ is supplied in order to set the magnitude of the shift.

The arrangement for carrying out the method is characterized by the features that, in order to form an output voltage $u'_A$, $u_A$ of the actuator control element 4 with only one polarity, the output conductor A, B' of the circuit 4a, 4b has interruptible unipolar power semiconductors S1, S2, S3, S4 in a matrix arrangement, that the interruptible unipolar power semiconductors are placed into the matrix in the direction, relative to the polarity of the output voltage, in which they take up the output voltage $u'_A$, $u_A$ as blockage voltage and switch off the current $-I_A$ from the positive output conductor to an alternating current input.

The arrangement for carrying out the method is characterized in that, in order to form an output voltage $u'_A$, $u_A$ of the actuator control element 4 with alternating polarity of the output conductors A, B', the circuit 4c has interruptible bipolar power semiconductors in a matrix arrangement, said semiconductors selectively blocking positive or negative voltages and switching off currents in both conduction directions.

The arrangement for carrying out the method is characterized by the features that each bipolar power semiconductor consists of two unipolar power semiconductors connected in opposition in series, whereby, with a positive output voltage $u'_A$, $u_A$, the controlling means $4_{ST}$ controls the controllable power semiconductors (S1P, S2P, S3P, S4P) that block a positive output voltage in the manner according to the invention during the rectifier operation and the inverter operation and it also controls the power semiconductors (S1N, S2N, S3N, S4N) provided for the negative output voltages into the conductive state as long positive output voltage is present, and whereby, with a negative output voltage $u'_A$, $u_A$, the controlling means $4_{ST}$ controls the controllable power semiconductors (S1N, S2N, S3N, S4N) that block a negative output voltage in the manner according to the invention during the rectifier operation and the inverter operation and it also controls the power semiconductors (S1P, S2P, S3P, S4P) provided for the positive output voltage into the conductive state as long negative output voltage is present.

Figure 7:
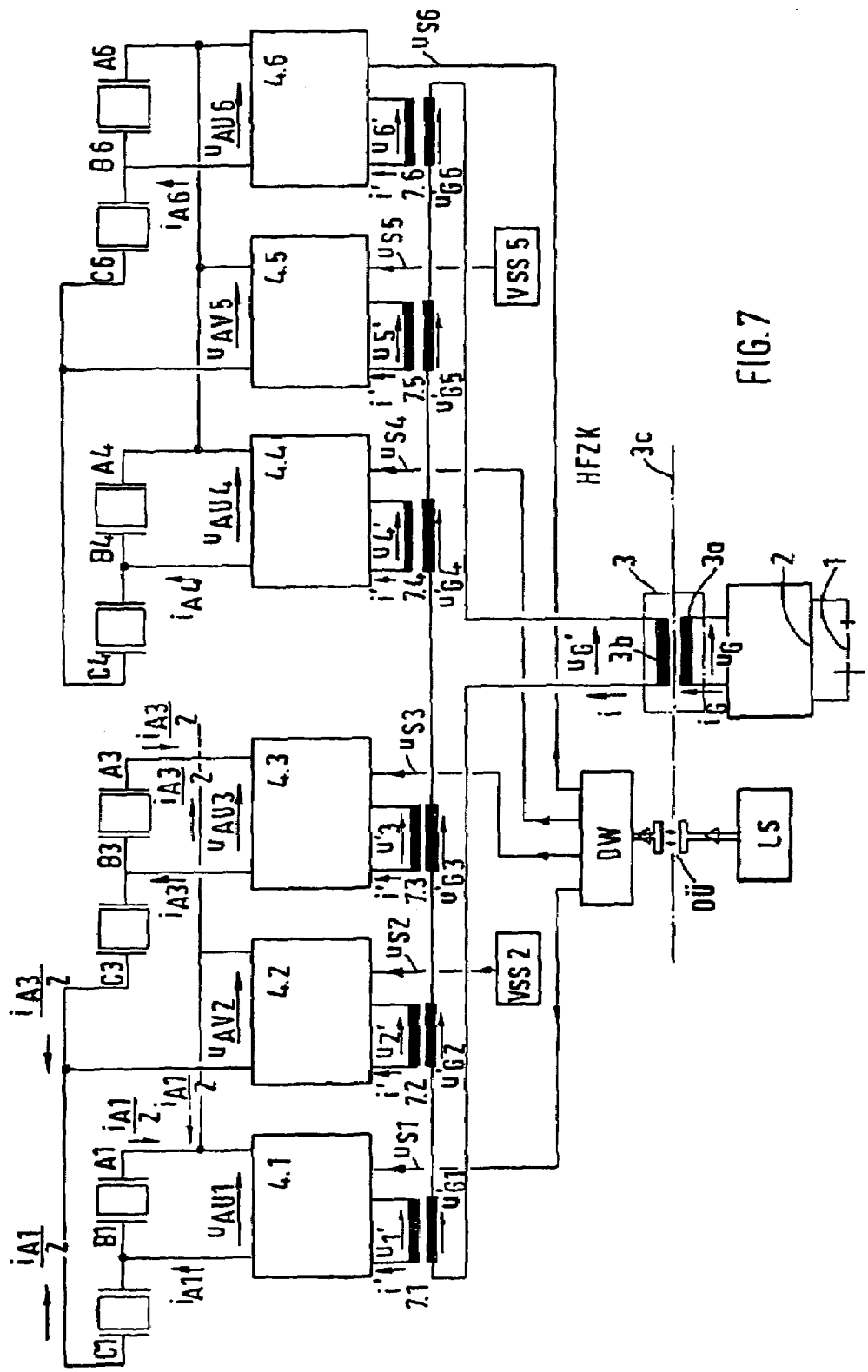

The arrangement for carrying out the method is characterized by the features that the actuator 5 comprises two stacks 5a, 5b that are electrically connected in series and are made of piezo electric material, that an actuator control element 4 or 4.1, FIG. 7, according to the invention is connected to the center terminal B and to a phase conductor terminal A of the serially connected stacks 5a, 5b, and a direct voltage $u_{AV}$ is applied as bias voltage to the phase conductor terminals A, C of the serially connected stacks 5a, 5b, said voltage being formed by a source of direct voltage that delivers and takes up at least half $i_A/2$ of the current $i_A$ impressed at the center terminal of the actuator control element 4 and, in this process, keeps the value of the direct voltage $u_{AV}$ constant.

The arrangement for carrying out the method is characterized in that the direct bias voltage $u_{AV}$ is delivered by a mains power supply configured according to the state of the art whose output capacitance is dimensioned in such a way that the currents $i_A/2$ of opposite directions caused by the actuator control element 4 do not give rise to any appreciable change in the direct bias voltage $u_{AV}$.

The arrangement for carrying out the method is also characterized in that the direct bias voltage $u_{AV}$ at the phase conductor terminals A, C of the serially connected stacks 5a, 5b is formed by an actuator control element 4.2, FIG. 7, according to the invention, to which a constant bias voltage setpoint VSS2 is supplied.

The arrangement for carrying out the method is characterized by the features that at least two actuators 5.1, 5.3, which are independent in terms of their mechanical movements having two serially connected stacks made of piezo electric material are each connected via their phase conductors A1, A3 and C1, C3 to a shared actuator control element 4.2 that keeps the bias voltage $u_{AV2}$ between the phase conductors A1, C1 and A3, C3 at a constant value, irrespective of the currents $i_{A1}$, $i_{A3}$ that flow via the actuators, also that actuator control elements 4.1, 4.3 impress currents $i_{A1}$, $i_{A3}$ into each of the actuators 5.1, 5.3 having two serially connected stacks made of piezo electric material via the center terminals B1, B3 and via the shared phase conductor terminals A1, A3 of the serially connected stacks in order to set the actuator charge-reversal voltages $u_{AU1}$, $u_{AU3}$ that are independent of each other as well as the appertaining independent movements, also that the impressed higher-frequency current i' is supplied to each actuator control element 4.1, 4.2, 4.3, etc. via the secondary winding b of the input transformers 7.1, 7.2, 7.3, etc., whose primary windings a are connected in series and form a higher-frequency intermediate current circuit (HFZK) shared by all actuator control elements, and also that the frequency generator 2 impresses its output current $i_G$ as intermediate circuit current i into the higher-frequency current source.

The arrangement is finally characterized in that the frequency generator 2 impresses its output current $i_G$ as intermediate circuit current i into the intermediate current circuit HFZK via a transformer 3 that bridges an isolating point 3.

The special advantage of the contactless transmission of power and/or control functions according to the invention in a system comprising at least one stationary and one moving part between which power is to be transmitted lies in the fact that no vibration-sensitive components such as, for example, electrolyte capacitors, have to be employed in the moving part while, at the same time, at least the same functional reliability exists as comparable systems known up until now for control and power transmission for capacitive actuators. Fundamentally, the arrangement according to the invention and the method according to the invention are equally well-suited for control and power supply of capacitive actuators over short as well as long distances, particularly also for systems in which no isolating points between stationary and moving parts have to be bridged.

SUMMARY OF THE INVENTION

Figure 2:
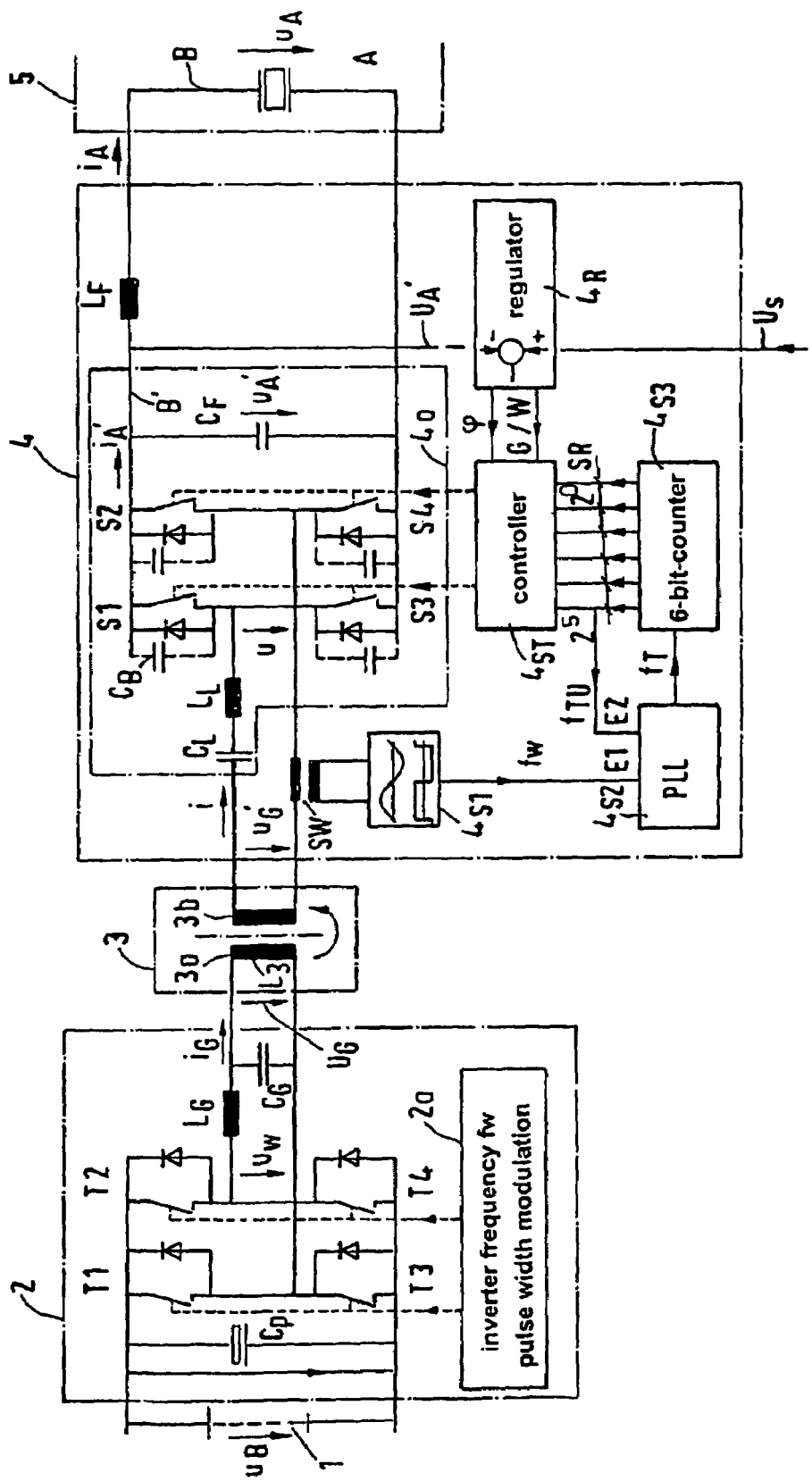
Figure 3:
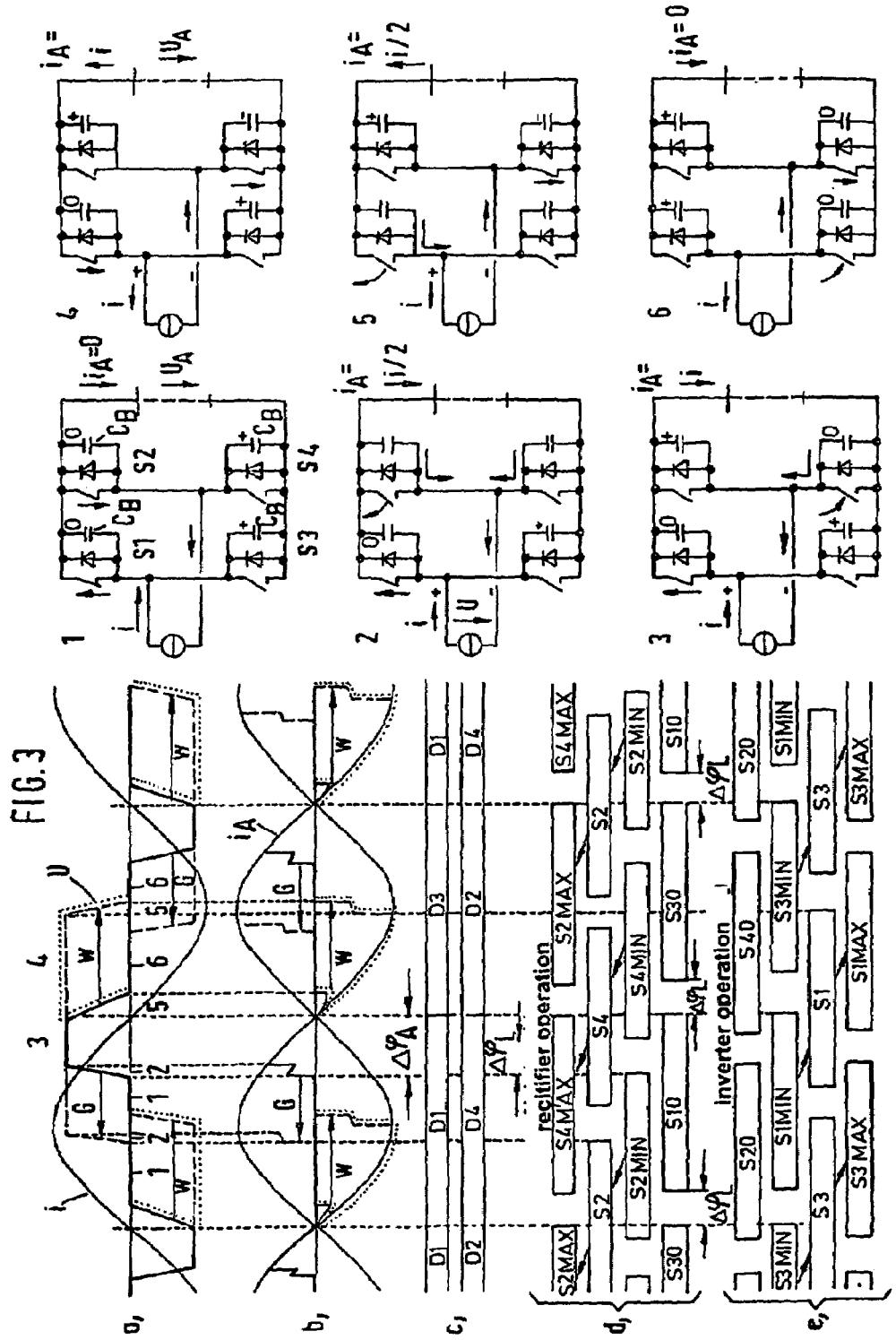
Figure 4:
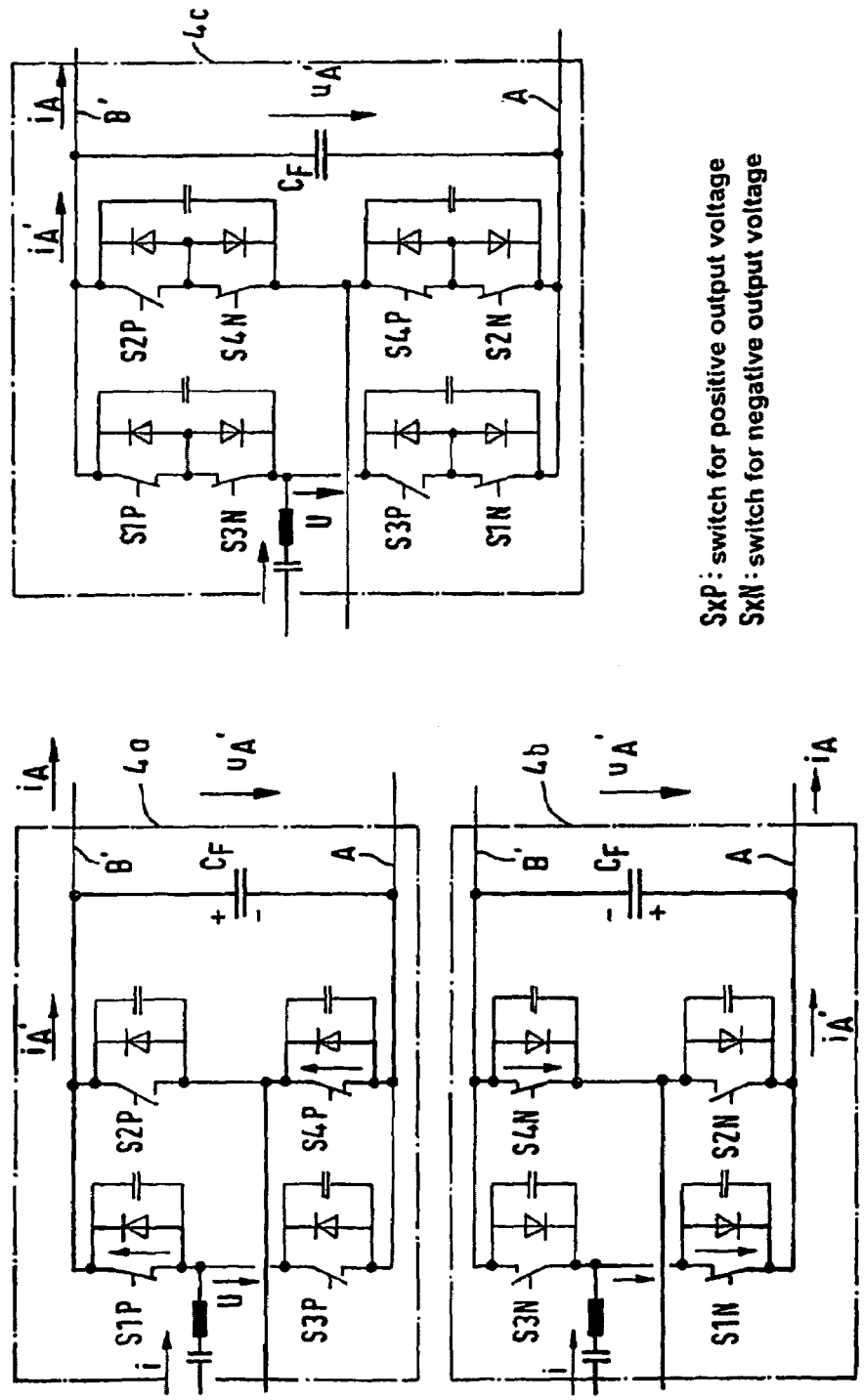
Figure 5:
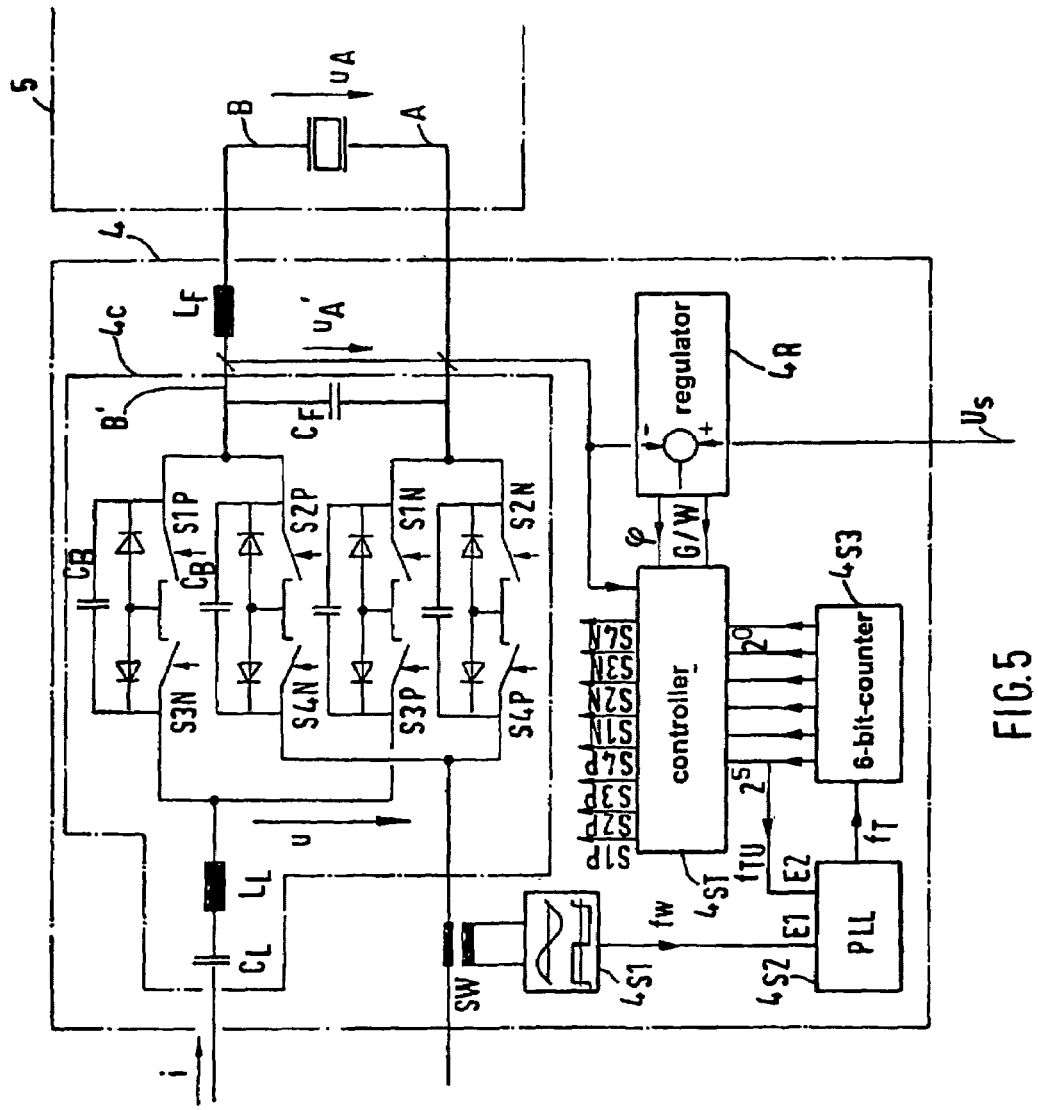
Figure 6:
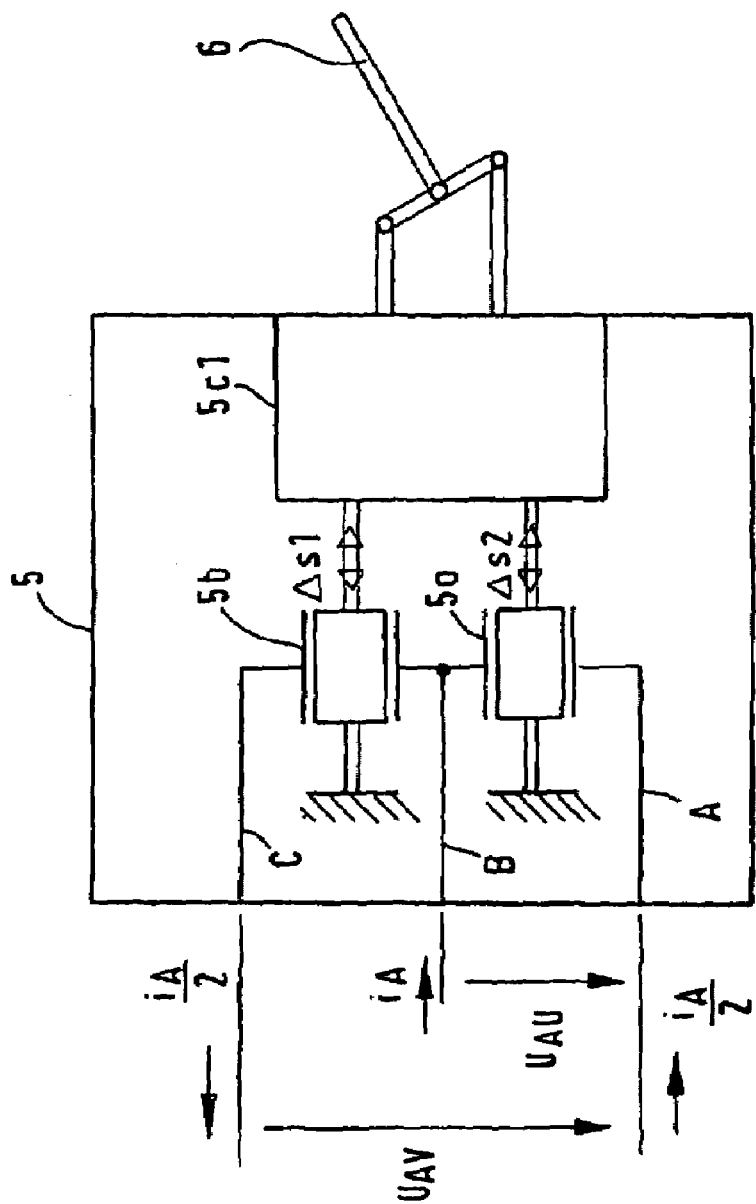
Figure 8:
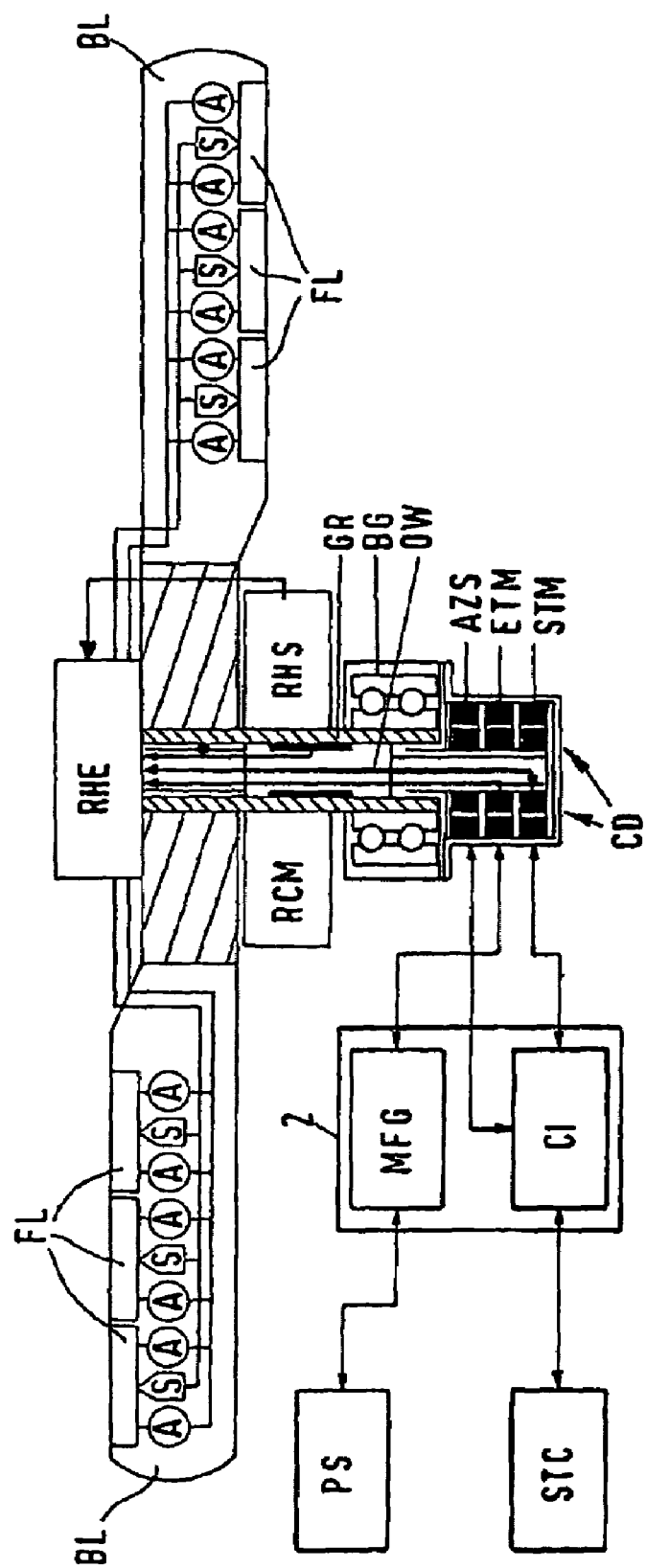
Figure 9:
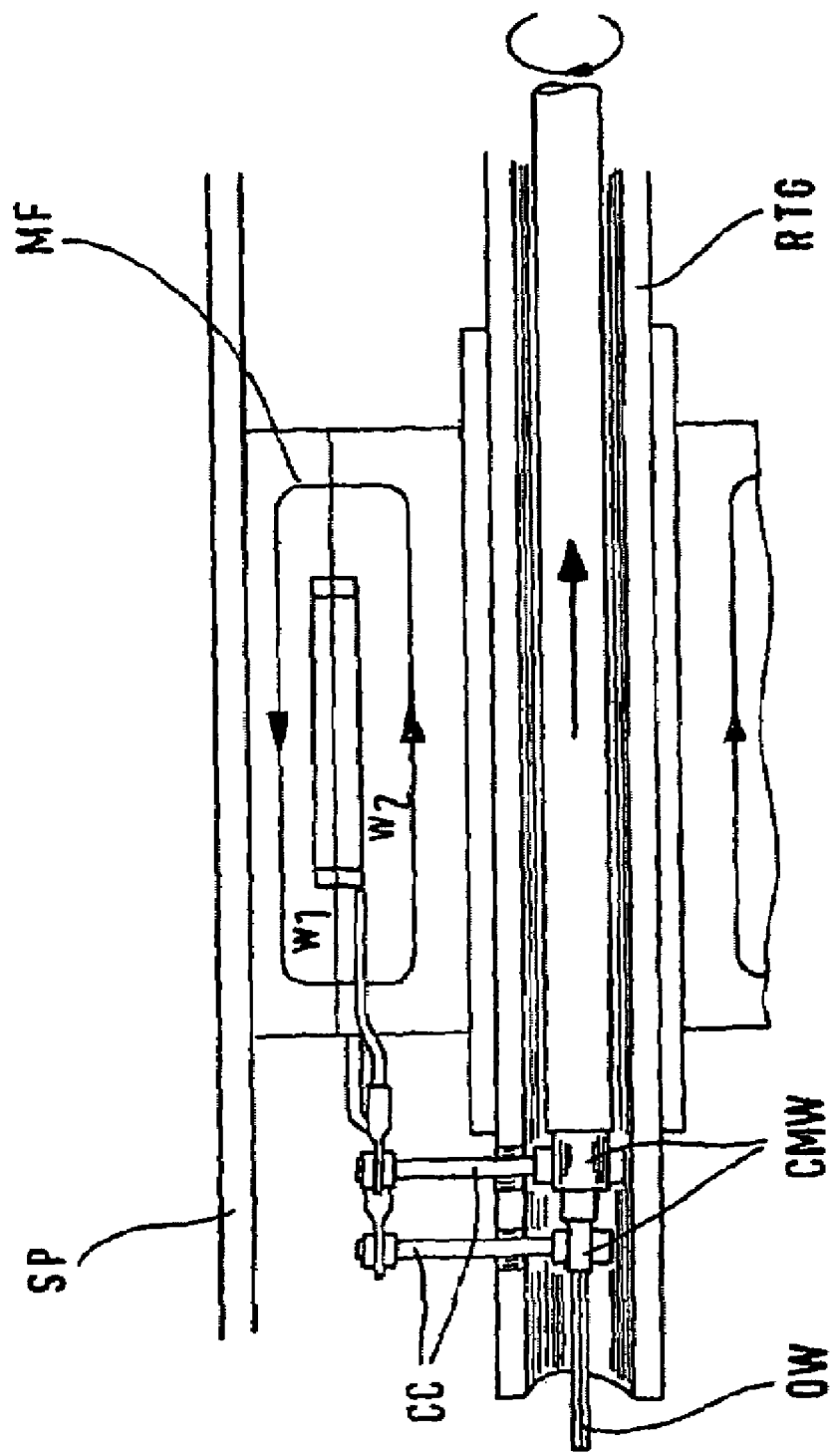

The invention will be explained in greater detail with reference to embodiments depicted in schematically simplified form in FIGS. 1 to 7. The following is shown:

FIG. 1—a schematic arrangement for carrying out the method with a stationary frequency generator 2, an inductive transformer 3 that bridges an isolating point, an actuator control element 4 and a capacitive actuator 5 with a stack 5a made of piezo electric material;

FIG. 2—by way of example, a circuit diagram for the schematic arrangement according to FIG. 1;

FIG. 3—diagrams a) to e) and switching states 1 to 6 of the actuator control element 4;

FIG. 4—explains the circuit diagram and the mode of operation of the power core 4c of an actuator control element 4 with bipolar output voltage $u'_A$;

FIG. 5—an embodiment of an actuator control element 4 with any desired output voltage;

FIG. 6—a schematic arrangement of a double actuator having two stacks 5a, 5b, made of piezo electric material;

FIG. 7—an embodiment with 4 double actuators on a shared power feed;

FIG. 8—the integration of a power supply according to the invention in the area of the rotor shaft and the rotor blades of a rotary-wing aircraft;

FIG. 9—a section through a device for power transmission in the area of the rotor shaft.

DETAILED DESCRIPTION

The schematic arrangement of the invention in FIG. 1 shows a stationary frequency generator 2 which, from a direct-voltage source 1 that can be a battery or a capacitor charged with direct voltage, generates a higher-frequency alternating current $i_G$ of, for instance, 100 kHz, having an amplitude $i_G$ that is independent of the amplitude and of the phase angle of the reverse voltage $u_G$. As a function of the phase angle of the reverse voltage, such a generator can emit or take up active power and reactive power.

In order to transport the power or the energy via the isolating point 3c to at least one actuator 5 on the moving part system, the alternating current $i_G$ is supplied to the primary winding 3a of an inductive transformer 3 that bridges the isolating point. On the moving part system, the secondary winding 3b of the transformer is connected to an electronic control element 4 that functions as an actuator control element and that, as a rule, comprises a converter connection. If the moving part system can be rotated, then the transformer 3 can be an inductive rotary transformer according to the state of the art, whose primary part is affixed in the pivot point of the movement and whose secondary part is rotatably mounted in the pivot point. In this case, the isolating point to be bridged runs through the interior of the rotary transformer as an air gap. By the same token, when it comes to linear movements, linear transformers are available for bridging an isolating point that runs along the movement path. The current i—separated into positive and negative half-waves or segments of these half-waves—coming from the secondary winding 3b of the transformer in accordance with its transmission ratio is always impressed into the capacitive actuator via an electronic actuator control element 4 in the direction in which the magnitude of the difference $u_S$-$u_A$ of a voltage setpoint $u_S$ and the actual actuator voltage $u_A$ decreases from one half-wave to the next. Once the voltage difference $u_S$-$u_A$ has reached zero or if this difference falls within a tolerance range that is accepted as being zero, the actuator control element 4 conducts the current i to the actuator control element past the actuator 5 via a short circuit of the supply lines. This short circuit is completely non-critical for the impressed current i.

Via a mechanical transmission 5c, the capacitive actuator 5 converts the length change Δs that occurs when a charge $\int i_A dt$ is applied to a stack 5a made of piezo electric material into an angular change of a flap 6.

With the method according to the invention, the higher-frequency alternating current i that is absolutely necessary for the transmission via the inductive transformer 3 and the actuator control element 4 can be used to charge or discharge the stack 5a made of piezo electric material without the need for a power storage means in the form of an electrolyte capacitor on the moving system.

It is obvious that the method according to the invention can also be employed to adjust the power of capacitive actuators if there is no need to bridge an isolation point by means of an inductive transformer.

If an isolating point is present, then as a rule, the setpoints $u_S$ of the actuator voltage, which are generated, for example, in a control system LS, have to be supplied via the isolating point $3c$ to the actuator control element 4 as bit-serial data words. In the embodiment of FIG. 1, these setpoints are transmitted via the isolating point by means of an optical or likewise inductive data-transfer means DÜ configured according to the state of the art and said setpoints are then converted by means of a data converter DW into the setpoints $u_S$ suitable for the actuator control element on the moving part system.

FIG. 2 shows, by way of example, an embodiment of the frequency generator 2 according to the invention and of the actuator control element 4 according to the invention. The frequency generator 2 is an inverter and consists of a bridge circuit of interruptible semiconductor power switches T1-T4, for example, MOS field-effect transistors or IGBTs, with a series-resonant circuit $L_G$, $C_G$ in the bridge diagonal and of a load coupled to the capacitor $C_G$ via the transformer 3. When the inverter frequency $f_W$, which is generated by an oscillator contained in the inverter control $2a$, coincides with the resonance frequency of the series-resonant circuit $$f_G = \frac{1}{2\pi\sqrt{L_G C_G}}$$

then a current $i_G$ that has the constant amplitude $$\hat{\imath}_G = \hat{u}_{WI} \cdot \sqrt{\frac{C_G}{L_G}}$$

and that is independent of the reverse voltage $u_G$ and thus of the connected load, is impressed into the transformer 3 connected to the capacitor. In this equation, $\hat{u}_{W1}$ stands for the fundamental wave amplitude of the inverter voltage $u_W$, which, when the input direct voltage $U_B$ fluctuates, is kept at a constant value by the pulse width modulation present in the inverter control $2a$. The output current amplitude $\hat{\imath}_G$ of the frequency generator 2 is independent of the magnitude of the reverse voltage $u_G$ and of its phase angle with respect to the current $i_G$. Therefore, at a constant current $\hat{\imath}_G$, the frequency generator 2 can not only deliver active power and reactive power to the moving secondary part via the transformer 3, but can also pick up active power from said moving secondary part and can supply the picked-up active power to the direct voltage source $U_B$.

As is known from the general teachings of the technology of power converters, the bridge circuit of the semiconductor power switches T1-T4 can be replaced by functionally equivalent half-bridge circuits with capacitive input voltage dividers or transformer star connections.

The magnitude of the reverse voltage $u_G$ and of its phase angle and thus the direction of the power flow are determined by the actuator control element 4 connected to the secondary winding $3b$ of the transformer 3. As a control element $4a$, said actuator control element 4 likewise contains a bridge circuit of semiconductor switches S1-S4 to which suppressor capacitors $C_B$ are also connected in parallel, the function of which will be elaborated upon below. A filter $C_F$, $L_F$ is located at the output of the bridge circuit leading to the actuator 5, and a filter $C_L$, $L_L$ is installed in the supply line of the higher-frequency alternating current i leading to the bridge circuit.

The filter $C_F$, $L_F$ serves to delimit the high-frequency ripple of the current $i_A$ to the actuator 5. Since the control element 4 only adjusts the actuator voltage $u_A$ with a frequency of, for example, 500 Hz at the maximum, but since the frequency of the current ripple of $i_A$ has twice the value of the frequency $f_W$, in other words, for example, 200 kHZ, the filter is configured in such a way that no appreciable difference exists between the low-frequency actuator voltage $u_A$ and the low-frequency voltage fraction of $u'_A$ at the filter capacitor $C_F$. The voltage difference $u'_A$-$u_A$ that occurs at the filter inductor $L_F$, is the high-frequency voltage ripple of, for example, 200 kHZ.

The filter $C_L$, $L_L$, which is configured as a series-resonant circuit and which is coordinated with the frequency $f_W$ of the frequency generator 2 or of the current i, is an acceptor circuit that does not offer any resistance to the current i. When the power switches S1-S4 are switched, the inductor $L_L$ of this filter takes up the abrupt voltage differences that occur between the voltage $u'_G$ that is transmitted from the capacitor $C_G$ to the secondary transformer winding $3b$ and the low-frequency output voltage $u'_A \approx u_A$ of the actuator control element 4.

In order to correct the actuator voltage $u_A$ or $u'_A$—which is a measure of the charge $\int i_A dt$ stored in the piezo electric material $5a$ and thus also of the length change $\Delta s$—to the time-variable setpoints $u_S$, a regulating means $4_R$ is present whose output signals φ and G/W influence the controlling means $4_{ST}$ of the actuator control element in such a way that current i supplied to the actuator control element—separated into positive and negative half-waves or segments of these half-waves—is impressed into the capacitive actuator in such a direction that the magnitude of the difference $u_S$-$u_A$ decreases. If this difference is positive, that is to say, $u_S$>$u_A$, then an additional charge has to be supplied to the actuator. This is identical to a power flow from the higher-frequency alternating current side to the direct voltage side—which is only variable at a low frequency—with the voltages $u'_A$ or $u_A$. For this purpose, the signal G/W causes the controlling means $4_{ST}$ to control the bridge circuit S1-S4 as a rectifier. The signal φ is a measure of the magnitude of the deviation $u_S$-$u_A$ and it determines the magnitude of the angle of the half-wave segments, as will still be explained in greater detail with reference to FIG. 3.

If the deviation $u_S$-$u_A$ is negative, that is to say, $u_S$<$u_A$, a charge or power is withdrawn from the actuator and supplied via the actuator control element 4 into the power transfer circuit through which the higher-frequency current i flows. Then, the signal G/W causes the controlling means $4_{ST}$ to control the bridge circuit S1-S4 as an inverter, whereby the signal φ, in turn, determines the magnitude of the angle of the half-wave segment in accordance with the magnitude of the deviation $u_S$-$u_A$.

The half-wave segments of the current i are formed by switching the semiconductor switches S1-S4 on and off via the controlling means $4_{ST}$ in fine grid steps synchronously to the waveform. In order to do so, the current converter SW and the circuits $4_{S1}$, $4_{S2}$ and $4_{S3}$ are used to generate a switching grid SR that is synchronous to the phase angle of the current i. In this switching grid, during rectifier operation as well as inverter operation, the semiconductor switches S1-S4 are only switched on in those time ranges or phase angle ranges in which the current i is already flowing over the diode that is connected in parallel to each switch. In this manner, turn-on losses are avoided when the semiconductor switches S1-S4 are switched on.

In order to form the switching grid SR, the current signal of a current converter SW that picks up the higher-frequency current i is supplied via a comparator stage $4_{S1}$ to a first phase input E1 of a Phase-Lock-Loop circuit $4_{S2}$. A signal $f_{TU}$ reduced by the factor $2^N$ from the output cycle $f_T$ by means of an N-stage counter $4_{S3}$ is supplied to the second phase input E2. The PLL circuit $4_{S2}$ adjusts the frequency of its output cycle $f_T$ in such a way that the frequency and phase angle deviation between the current signal at the input E1 having the frequency $f_W$ and the reduced signal having the frequency $f_{TU}$ is zero at the input E2. The N-output signals SR of the N-stage counter then form the switching grid SR that is synchronized to the zero crossings of the alternating current i. In the example of FIG. 2, N=6. At a frequency $f_W$ of the current i of 100 kHz, the switching grid in which the semiconductor switches S1-S4 are switched on and off once per 100-kHz period then has a time resolution of $$\Delta t = \frac{1}{2^6 \cdot 10^5 s^{-1}} = 156 \, \text{ns}.$$

In FIG. 3, diagrams a) to e) as well as the switching states 1 to 6 explain the setting of the actuator current $i_A$, that is to say, the formation of the half-wave segments from the current i for rectifier operation as well as inverter operation, a process in which switching losses are avoided when the semiconductor switches S1-S4 are switched.

Diagram 3a) shows the curve of the voltage u at the alternating-current side input of the bridge circuit S1-S4 in association with the impressed current i. Diagram 3b) shows the appertaining formation of the current segments from the half-waves of the current i. The voltage segments and current segments of the inverter operation are indicated by additional dotted lines. The numerals in the voltage diagram a) indicate time ranges that correspond to the switching states 1 to 6 in the right-hand side of FIG. 3.

Diagram c) designates the conductive areas of the diodes that are integrated into the switches S1-S4.

Diagrams d) and e) depict the possible conductive areas of the controllable semiconductor switches S1-S4 that lie in the synchronized switching grid SR, and this is done for the rectifier operation in diagram d) and for the inverter operation in diagram e). The outlined conductive areas designate the angle or time range within which the associated switches S1-S4 are controlled into the conductive state. Conductive areas for three settings of the actuator current, namely, minimum, medium and maximum current, are depicted for the rectifier operation as well as for the inverter operation. Between the conductive areas of the semiconductor switches S1 and S3 as well as S2 and S4, which are connected in series with respect to the actuator voltage $u_A$, there is a gap area $\Delta_{\phi L}$ in which the switch pairs connected in series always block at the same time and the suppressor capacitors $C_B$; which are connected in parallel to the switches, are charge-reversed, as will be explained in greater detail below. In order to set the actuator current that is to be transmitted, in each operating state, a switch pair S1 and S3 or S2 and S4 connected in series retains the phase angle of its conductive areas with respect to the impressed current i, while the conductive areas of the corresponding other switch pair are shifted in grid steps $\Delta t$ between the minimum setting SXMIN, in which the minimum current is being transmitted, and the maximum setting SXMAX with the maximum current transmission.

With the actuator control element 4 according to the invention, in all operating states, the conductive areas have such a phase angle that the impressed current i, during its zero passage, either makes the transition from one diode to the switch that is connected in parallel and that has already been switched on, or else, after the charge-reversal of the suppressor capacitors $C_B$, continues to flow over the diode of the switch connected in series. In this manner, turn-on losses of the controllable semiconductors are avoided.

The conductive switch is switched off at the end of a conductive area, the current i then charge-reverses the suppressor capacitors $C_B$ connected in parallel and then likewise flows over the diode of the switch connected in series. The switching off must take place at an angle $\Delta_{\phi A}$ to such an extent before the next current zero passage that, in the gap area $\Delta_{\phi L}$ that follows the switching off, the current i is sufficient to charge-reverse the suppressor capacitors $C_B$ connected in parallel to the switches by the magnitude of the actuator voltage $u_A$.

During the transition of the current from one diode to the controllable switch that is connected in parallel, no additional voltage occurs aside from the low conducting voltage. Even when a switch is switched off, when the current makes the transition from this switch to the capacitors connected in parallel, the voltage at the switch is initially zero and then rises once the switch blocks at a transconductance of $$\frac{du}{dt} = \frac{i}{2C_B}$$

that is determined by the capacitance value of the capacitors that are connected in parallel. The switching losses of the controllable switches are virtually zero for these switching procedures. As is shown in greater detail with reference to the diagram and to switching states in FIG. 3, this current transfer is identical in rectifier operation and in inverter operation.

In state 1, the impressed current i flows in a short-circuit over the switched-on switches S1 and S2. In this process, no current is supplied to the actuator, which is depicted here in simplified form as a source of direct voltage having the voltage $U_A$. State 2 starts with the opening of the switch 2 at the end of the conductive area of S2 in diagram d). The current i now flows in state 2 over the suppressor capacitors that are connected in parallel to the switches S2 and S4. Due to the fact that the capacitors are identical, the current i/2 flows over each capacitor and only the current of the capacitor connected in parallel to S4 flows over the direct voltage source $U_A$. The charge-reversal state 2 is completed and makes the transition to state 3 once the capacitor $C_B$ that is connected in parallel to S2 is charged so as to reach the voltage $U_A$ and the capacitor $C_B$ that is connected in parallel to S4 has been completely discharged. In state 3, the current i first flows over the switch S1 and the diode that is connected in parallel to the switch S4 as well as over the actuator counter to the voltage $U_A$. Rectifier operation is present, with power flow from the alternating-current side to the direct-voltage side. Once the gap area $\Delta_{\phi L}$ has been passed, the de-energized switch S4 is closed.

Diagram a) shows the appertaining voltage u in association with the current i at the input of the bridge circuit while diagram b) shows the corresponding segment of a half-wave of the current i.

It can be seen in diagrams a), b) and d) that a leading shift of the conductive areas of S2, S4 towards the left out of the initial positions designated by S2MIN and S4MIN, as indicated by the arrow G, causes the current segments supplied to the actuator to be increased until approximately the entire half-wave is supplied to the actuator. When the conductive areas are shifted back to the right, the current segments are reduced all the way to the angle $\Delta_{\phi A}$. This angle $\Delta_{\phi A}$ is the angular distance of the right-hand limits of the conductive areas of S2MIN and S4MIN from the subsequent current zero passage and has to be somewhat larger than the gap area $\Delta_{\phi L}$ that starts at the same time, so that the charge reversal of the capacitors CB that are connected in parallel to S2 and S4 is completed before the switch S4 closes and before the next zero passage of the current i. The closing of the switch S4 after the charge reversal of the suppressor capacitors and before the zero passage of the current i takes place de-energized since in this area, the diode connected in parallel to S4 is conductive.

As the switches S1 and S3 show in diagram d), during rectifier operation, the conductive areas S10 and S30 of the switches S1 and S3—which remain in their initial position—open with every zero passage. In this process, after the current zero passage and after the opening of the switch S1, the state 3 makes the transition to state 5 in which the capacitor connected in parallel to the switch S1 is now charged so as to reach the voltage $U_A$ and the capacitor that is connected in parallel to the switch S3 is discharged. Once the latter has been discharged, the diode connected in parallel takes over the current and the switch S3 is closed after the gap area $\Delta_{\phi L}$. The impressed current i now flows in the area 6 in a short-circuit over the switch S3 and the diode connected in parallel as well as the switch S4. The area 6, which lies in the negative half-wave of the current i, corresponds to the area 1 in the positive half-wave.

As shown in diagram e), the conductive areas of all of the switches in the initial position of the rectifier operation and in the initial position of the inverter operation have the same phase angle with respect to the impressed current i. Therefore, the initial position of the inverter operation is the initial position of the rectifier operation.

The inverter operation is realized in that now the conductive areas of the switches S2 and S4 remain in their initial position S20 and S40 and the phase angle of the conductive areas of the switches S1 and S3 are shifted out of their initial position, trailing to the right. As a result, the switch S I remains closed at the end of area 3 after the zero passage of the current i. With the current zero passage, area 3 makes the transition to area 4 of the inverter operation while the switch settings remain unchanged. In this process, the power flow direction changes, the actuator is discharged and the power is supplied to the alternating current circuit. The transition from rectifier operation to inverter operation takes place by lengthening the switch state 3 beyond the current zero passage, without the need for an additional switching procedure in area 4 indicated by the dotted lines. The discharge current $i_A$ of the actuator is set as a function of the magnitude of the shift of the conductive areas of the switches S1 and S3 with respect to the initial state S1MIN=S10 and S3MIN=S30 as indicated by the arrow W. When the switch S1 is switched off at the end of the conductive area, the transition is made to the state 5 described above. With a symmetrical position of the charge-reversal states 2 and 5 with respect to the zero passage, precisely as much charge and power are withdrawn from the actuator in the areas 4 and 5 in inverter operation as were previously supplied to it in the half-wave in the areas 2 and 3 in rectifier operation, that is to say, in this position of the conductive areas, the mean value of the charge transport and of the power flow is zero.

As shown in diagrams a) to e) and in the switching states 1 to 6, in each half-wave of the impressed higher-frequency alternating current i, the actuator control element 4 according to the invention consecutively has a phase of the operating state "inverter operation" with the charge and power transport from the actuator 5, 5a to the alternating-current side, a phase of the operating state "no-load" with short-circuited alternating-current input and without a change in the charge and power state of the actuator, and a phase of the operating state "rectifier operation" with the charge and power transport from the alternating-current side to the actuator 5, 5a. The phase of "inverter operation" starts automatically with every zero passage of the current i whenever the controllable power semiconductors that are connected in parallel to the conductive diodes have been switched on during the phase of "rectifier operation" that comes before the current zero passage. The phase of "inverter operation" can be terminated at any desired point in time within the momentary half-wave by switching off one of the two controllable power semiconductors that are conductive during the "inverter phase". The actuator control element then goes into "no-load phase". When the other controllable power semiconductors that are still conductive in the "no-load phase" are switched off, the phase of "rectifier operation" sets in. This has to be done at least at an angle $\Delta_{\phi A}$ before the subsequent zero passage of the current i in order to ensure complete charge reversal of the suppressor capacitors $C_B$ in the gap area $\Delta_{\phi L}$.

The transition between the phases of the operating states is made through switch off procedures during which no turn-off losses occur. The magnitude and direction of the mean charge and power transport via the actuator control element according to the invention are determined by the duration or the magnitude of the angular ranges of the individual phases and are set in the rectifier operation via the leading shift "G" of the switches S2, S4 with respect to the initial positions S2MIN=S20 and S4MIN=S40 and in the inverter operation via the trailing shift "W" of the switches S1, S3 with respect to the initial positions S1MIN=S10 and S3MIN=S30.

The circuit arrangement according to FIGS. 1 and 2 allows only the setting of actuator voltages $u_A$ having one polarity sign, in other words, the output line B can only have a positive polarity with respect to the output line A. For certain actuators, however, actuator control elements 4 are needed with positive and negative output voltage. An actuator control element 4 according to the invention that meets this requirement is depicted in FIG. 5. It differs from the actuator control element 4 shown in FIG. 2 in that, in the control element 4c, instead of the semiconductor switches S1, S2, S3, S4 of the circuit 4a—which can only block voltage having one polarity and can switch current on and off in one direction—semiconductor switches are used that can block voltages having both polarities and that can switch currents on and off in both directions. As shown in FIG. 4c and FIG. 5, such bidirectional semiconductor switches consist, for instance, of a pair of controllable semiconductors connected in opposition in series, namely, S1P/S3N, S2P/S4N, S4P/S2N.

The mode of operation of an actuator control element 4 for bidirectional output voltages is explained with reference to the control elements 4a) to 4c) shown in FIG. 4. FIG. 4a) once again shows the control element for the positive output voltage $u'_A$ of the actuator control element 4 shown in FIG. 2. In order to form a negative output voltage $u'_A$, the controllable semiconductor switches have to be arranged with respect to the output lines A, B' in accordance with the diagram shown in FIG. 4b). In order to differentiate among the semiconductors in both arrangements, the switches S1-S4 additionally have the designation "P" in the arrangement for the positive output voltage and the designation "N" in the arrangement for the negative output voltage. In both arrangements, the numerals 1 to 4 designate semiconductor switches that are actuated in phase relative to the input current i. The circuit 4c delivers a positive output voltage when the semiconductor switches designated with "N" are constantly switched into the conductive state and the semiconductor switches designated with "P"

are actuated in the manner described with reference to FIGS. 2 and 3. When a negative output voltage u'$_A$ is formed, the semiconductor switches designated with "P" are constantly switched into the conductive state and the semiconductor switches designated with "N" then receive the control signals that are supplied to the semiconductor switches designated with "P" and having the same reference numeral when a positive output voltage is generated. The control signals are switched over in the controlling means 4$_{ST}$ of FIG. 5 as a function of the polarity sign of the difference u$_S$-u$_A$, whereby this information about the polarity sign is contained in the information φ during the zero passage of the output voltage of the actuator controller, that is to say, at u'$_A$ =0.

As shown in FIG. 6, piezo electric actuators are particularly advantageously fitted with two stacks 5a, 5b operated in phase opposition and made of a piezo electric material. Here, the two piezo stacks 5a and 5b are connected in series with respect to a bias voltage u$_{AV}$ that is kept approximately constant, and in parallel with respect to a charge-reversal voltage u$_{AU}$ that is applied between the center terminal B and a phase conductor terminal, for example, A. By means of such a double actuator, longer control paths Δs1+Δs2 and greater actuating forces are achieved than with an actuator that has only one piezo stack. As far as the capacitance is concerned, the two stacks of a double actuator are largely the same. When the current i$_A$ is impressed via the center conductor B, half of the current flows back via each of the two phase conductors A and C, respectively. In this context, the upper piezo stack 5b in FIG. 6 is discharged in the transfer direction of the bias voltage u$_{AV}$ and the lower piezo stack 5a is further charged in the transfer direction of the bias voltage u$_{AV}$, so that the elongation caused by the charge decreases in the upper stack while the elongation increases on the lower stack. The feed of such a double actuator can be effectuated, for instance, with two actuator controllers according to the invention. If more than two double actuators having the same control tasks are actuated, they can obtain their bias voltage from a shared actuator controller.

Since the bias voltage u$_{AV}$ of double actuators is normally constant and only the charge-reversal voltage u$_{AU}$ is changed in order to control the movement, the direct bias voltage can also be generated by a mains power supply according to the state of the art. At an approximately constant output voltage u$_{AV}$, this mains power supply, however, must be capable of delivering or picking up the current $$\sum_{x=1}^{x=m} \frac{i_{Ax}}{2}$$

of m double actuators that flows over the interconnected phase conductors A$_X$, C$_X$. This property can be attained, for example, in that the output capacitance of the mains power supply is dimensioned considerably larger than the capacitance of the double actuators.

The embodiment of FIG. 7 has two groups with two double actuators each. Each of the two actuator groups has its own bias voltage control element 4.2 and 4.5, respectively. They are supplied with the generally constant bias voltage setpoints VSS2 and VSS5. The actuator control elements 4.1 and 4.3 of the first group or the actuator control elements 4.4 and 4.6 of the second group set the voltages u$_{AU1}$, u$_{AU3}$ and u$_{AU4}$, u$_{AU6}$ through the currents i$_{A1}$, i$_{A3}$ and i$_{A4}$, i$_{A6}$, respectively, and thus set the charges and the length changes of the double actuators on the basis of the voltage setpoints u$_{S1}$, u$_{S3}$ and u$_{S4}$, u$_{S6}$, respectively. These voltage setpoints are generated as bit-serial data words in a control system LS in accordance with the embodiments presented in FIG. 1 and FIG. 7, transmitted via the isolating point 3c by means of a data-transfer means DÜ configured according to the state of the art, converted on the moving part system by means of a data converter DW into the setpoints that are suitable for the actuator control elements 4.1, 4.3 and 4.4, 4.6, respectively, and then supplied to the control elements.

The impressed current i' is supplied to each of the actuator control elements 4.1, 4.3, 4.4, 4.6 and to the bias voltage control elements 4.2 and 4.5 via the secondary windings of the input transformers 7.1, 7.2, 7.3, 7.4, 7.5 and 7.6 whose primary windings are connected in series and that are supplied by the impressed current i from the secondary winding 3b of the transformer 3 that bridges the isolating point. The primary winding 3a of this transformer is supplied according to the arrangements of FIG. 1 and FIG. 2 by the frequency generator 2 according to the invention with a higher-frequency alternating current i$_G$ having a constant amplitude. If there is no isolating point that needs to be bridged, the frequency generator 2 supplies its output current i$_G$ directly to the serially connected primary windings of the input transformers 7.1 to 7.6. These input transformers achieve freedom of potential and adaptation of the current to the control elements 4.1 to 4.6 on the secondary side of the transformers. Therefore, the outputs of the potential-free control elements can be connected to each other and can have a shared earth potential. The input voltages u'$_1$ to u'$_6$ of the control elements 4.1 to 4.6 in FIG. 7 correspond to the input voltage u'$_G$ of the control element 4 in FIG. 1 and FIG. 2. The voltages u'$_{G1}$ to u'$_{G6}$ transmitted from the inputs of the control elements to the series connection of the primary windings add up in the higher-frequency intermediate current circuit HFZK that consists of the serially connected primary windings of the input transformers 7.1 to 7.6. and of the secondary winding 3b of the transformer that bridges the isolating point 3c, so as to yield the total voltage u'$_G$. Here, power flows, which are oriented in the opposite direction, balance each other in the intermediate current circuit HFZK through the addition of voltages oriented in opposite directions. For example, a power flow over the actuator control element 4.1 to the connected actuator results in an input voltage u'$_1$ that is considered positive as indicated by the arrow direction of the input current i'. Half of the actuator current i$_{A1}$, in other words, the current i$_{A1}$/2, flows back via the bias voltage control element 4.2. At the bias voltage control element 4.2, the association of the current i$_{A1}$/2 with the bias voltage u$_{AV2}$ yields a power flow from the actuator side to the higher-frequency intermediate current circuit. The appertaining input voltage u'$_2$ is then oriented in the opposite direction from the input voltage u'$_1$, as a result of which the total power in the intermediate current circuit HFZK is reduced. Therefore, only the resulting total power of all of the actuators is transmitted via the transformer 3.

FIG. 8 serves to show in a simplified manner how a device of the type described above as well as the appertaining method can be used by employing the device in the area of the rotor shaft GR and of the rotor blades BL of a rotary-wing aircraft, especially a helicopter. The necessary electronic components such as, for instance, the power supply PS and the frequency generator MFG with the electronic controls CI as well as the connection to the flight controls STC of the helicopter are all permanently installed on board of the helicopter.

In addition to various bearings BG, several contactless coupling devices CD are provided on the rotor shaft GR. Said coupling devices CD can be configured along the lines of an optical coupler DÜ (see FIG. 1), as is the case with the signal transmission STM from the electronic controls CI integrated into the control system LS to the optical waveguide OW. On the other hand, contactless inductive signal transformers 3 (see FIG. 1) are provided which are employed, for example, for the power transmission ETM from the frequency generator MFG to the rotor head electronics RHE.

Both types of transmission can be employed to transmit the signals of the azimuth sensor AZS. The azimuth sensor AZS serves to generate setpoints for all kinds of actuators as a function of the momentary position of the rotor blade in question within one revolution.

Other functional units, such as the mechanical rotor control RCM and the rotor head sensors RHS, which only relate indirectly to the invention, are indicated in the area of the rotor shaft. Additional electric connections into the rotor blades BL lead from the rotor head electronics RHE to the actuators A, which move the rudder flaps FL, and lead to the sensors S, which detect the position of the rudder flaps FL. Here, the rudder flaps FL serve as an example of various embodiments of aerodynamically active devices on the rotor blades. Therefore, the rotor head electronics RHE contain the electronic actuator control element 4 comprehensively described above (see FIGS. 1, 2) and the other electronic circuits such as, for instance, the data converter DW (see FIG. 1), needed to actuate and control the actuators A.

FIG. 9 finally shows a detailed solution pertaining to the contactless inductive power transmission ETM that is shown only schematically in a simplified version in FIG. 8. Inside a static rotor shaft bearing SP, a rotor shaft RTG configured as a hollow shaft is rotatably mounted. The optical waveguide OW for the optical transmission of data is arranged in the area of the axis of rotation of the rotating hollow shaft RTG, and coaxially thereto are the two conductive metal pipes CMW. These two conductors lead in the arrow direction towards the right to the rotor head electronics RHE (not shown here).

The two conductive metal pipes CMW are electrically connected via the connecting lines CC to the winding $w_2$ (corresponding to 3b in FIG. 1) that rotates together with the rotor shaft. Together with the static winding $w_1$ (corresponding to 3a in FIG. 1), the rotating winding $w_2$ forms the contactless transformer (corresponding to 3 in FIG. 1). The supply lines leading to the stationary winding $w_1$ are not depicted explicitly in FIG. 9.

What is claimed is:

1. A device for contactless electrical power transmission in a rotary-wing aircraft system including a stationary portion of a rotor shaft bearing of a rotary-wing aircraft and a rotor shaft of the rotary-wing aircraft, power being transmitted between the stationary portion of the rotor shaft bearing of the rotary-wing aircraft and the rotor shaft of the rotary-wing aircraft, the device comprising:

an inductive transformer including a primary winding disposed on the stationary portion of the rotor shaft bearing of the rotary-wing aircraft and a secondary winding disposed on the rotor shaft of the rotary-wing aircraft, the inductive transformer bridging an isolating point between the stationary portion of the rotor shaft bearing of the rotary-wing aircraft and the rotor shaft of the rotary-wing aircraft;

a frequency generator having a series-resonant circuit capacitor connected to the primary winding; and at least one capacitive actuator disposed in operative connection with at least one actuator control element, the at least one actuator control element being connected to the secondary winding and including a matrix arrangement of a plurality of switchable power semiconductors, wherein at least portions of the inductive transformer, frequency generator and at least one actuator control element are disposed in an area of the rotor shaft and a rotor head of the rotary-wing aircraft, the at least one actuator control element including a plurality of generating devices, a regulator, and a controller, the controller being configured to impress positive and negative half-waves or half-wave segments of a high-frequency alternating current into the actuator, the regulator being connected to the controller so as to form difference sized half-wave segments of a current using a magnitude signal as a function of a magnitude of a difference between a setpoint actuator voltage and an actual actuator voltage, and so as to control the power semiconductors using a polarity signal as a function of a polarity sign of the difference between the setpoint actuator voltage and the actual actuator voltage, in such a way that, when the polarity sign of the difference is negative, a successive charge or power is withdrawn from the actuator from one half-wave to the next and, when the polarity sign of the difference is positive, a successive charge or power is supplied to the actuator from one half-wave to a next half-wave, the controller being connected to the generating devices so as to generate switching grid signals of a switching grid synchronized with the alternating current, and the controller being connected to the regulator so as to supply the polarity signal so as to set a direction of the shift and a magnitude signal so as to set a magnitude of the shift, the controller including:

a logic device configured to form switching signals of an initial position of pairs of the switchable semiconductors connected in series using the switching grid signals, and a shift advance device configured to advance switching of a switch pair by a shift relative to the initial position during a rectifier operation and the controller includes a shift lag device configured to subtract switching-of the switch pair by the shift relative to the initial position during an inverter operation.

2. The device as recited in claim 1, wherein the at least one capacitive actuator is disposed in at least one rotor blade of the rotary-wing aircraft.

3. The device as recited in claim 1, wherein:
a) the plurality of switchable power semiconductors include unipolar switchable power semiconductors configured to form an output voltage of the actuator control element with only one polarity of at least one output conductor; and
b) the unipolar switchable power semiconductors are disposed in direction relative to the only one polarity of the output voltage and are configured to take up the output voltage as blockage voltage and to switch the current from a positive one of at least one output conductor to an alternating current input.

4. The device as recited in claim 1, wherein the plurality of switchable power semiconductors include bipolar switchable power semiconductors configured to form an output voltage of the actuator control element with alternating polarity of output conductors, the bipolar semiconductors selectively blocking positive or negative voltages and switching currents in both conduction directions.

5. The device as recited in claim 1, further comprising an azimuth sensor disposed on the rotor shaft and having an output connected to the actuator control element.

6. The device as recited in claim 1, further comprising:

an aerodynamically active-device actuated by a capacitive actuator and having an output connected to the capacitive actuator; and at least one sensor disposed in an area of a rotor blade and configured to detect a position of the aerodynamically effective device.

7. The device as recited in claim 1, further comprising electrical controls and wherein the actuator control element and the electrical controls are disposed in the rotor head and are connected to the inductive transformer via lines disposed in the rotor shaft.

8. A method to provide power of at least one capacitive actuator wherein the at least one actuator is arranged on a moving part system that is separated from a stationary system by an isolating point, the method comprising:

generating a high-frequency alternating current from a direct voltage using a frequency generator disposed in the stationary system, the high-frequency alternating current having an amplitude independent of a phase angle and of an amplitude of a reverse voltage;

transmitting the alternating current from a primary winding of an inductive transformer that bridges the isolating point; and separating the alternating current coming from a secondary winding of the inductive transformer in the moving part system into positive and negative half-waves or segments of these half-waves and always impressing the alternating current into the at least one actuator using an electronic control element in a direction such that a length change of the actuator occurs in a desired direction in each half-wave, the electronic control element including a plurality of switchable power semiconductors, a plurality of generating devices, a regulator, and a controller, the controller being configured to impress positive and negative half-waves or half-wave segments of a high-frequency alternating current into the actuator, the regulator being connected to the controller so as to form difference sized half-wave segments of a current using a magnitude signal as a function of a magnitude of a difference between a setpoint actuator voltage and an actual actuator voltage, and so as to control the power semiconductors using a polarity signal as a function of a polarity sign of the difference between the setpoint actuator voltage and the actual actuator voltage, in such a way that, when the polarity sign of the difference is negative, a successive charge or power is withdrawn from the actuator from one half-wave to the next and, when the polarity sign of the difference is positive, a successive charge or power is supplied to the actuator from one half-wave to a next half-wave, the controller being connected to the generating devices so as to generate switching grid signals of a switching grid synchronized with the alternating current, and the controller being connected to the regulator so as to supply the polarity signal so as to set a direction of the shift and a magnitude signal so as to set a magnitude of the shift, the controller including:

a logic device configured to form switching signals of an initial position of pairs of the switchable semiconductors connected in series using the switching grid signals, and a shift advance device configured to advance switching of a switch pair by a shift relative to the initial position during a rectifier operation and the controller includes a shift lag device configured to subtract switching-of the switch pair by the shift relative to the initial position during an inverter operation.

9. A method to provide power of at least one capacitive actuator, the method comprising:

generating a high-frequency alternating current from a direct voltage using a frequency generator, the high-frequency alternating current having an amplitude independent of a phase angle and of an amplitude of a reverse voltage;

separating the high-frequency alternating current into positive and negative half-waves or segments of these half-waves; and always impressing the high-frequency alternating current into the actuator using an electronic control element in such a direction that a length change of the actuator occurs in a desired direction in each half-waves, the electronic control element including a plurality of switchable power semiconductors, a plurality of generating devices, a regulator, and a controller, the controller being configured to impress positive and negative half-waves or half-wave segments of a high-frequency alternating current into the actuator, the regulator being connected to the controller so as to form difference sized half-wave segments of a current using a magnitude signal as a function of a magnitude of a difference between a setpoint actuator voltage and an actual actuator voltage, and so as to control the power semiconductors using apolarity signal as a function of a polarity sign of the difference between the setpoint actuator voltage and the actual actuator voltage, in such a way that, when the polarity sign of the difference is negative, a successive charge or power is withdrawn from the actuator from one half-wave to the next and, when the polarity sign of the difference is positive, a successive charge or power is supplied to the actuator from one half-wave to a next half-wave, the controller being connected to the generating devices so as to generate switching grid signals of a switching grid synchronized with the alternating current, and the controller being connected to the regulator so as to supply the polarity signal so as to set a direction of the shift and a magnitude signal so as to set a magnitude of the shift, the controller including:

a logic device configured to form switching signals of an initial position of pairs of the switchable semiconductors connected in series using the switching grid signals, and a shift advance device configured to advance switching of a switch pair by a shift relative to the initial position during a rectifier operation and the controller includes a shift lag device configured to subtract switching-of the switch pair by the shift relative to the initial position during an inverter operation.

* * * * *